(12) United States Patent
Ghoting et al.

(10) Patent No.: US 8,738,289 B2
(45) Date of Patent: May 27, 2014

(54) ADVANCED ROUTING OF VEHICLE FLEETS

(75) Inventors: Amol Ghoting, Pomona, NY (US); Deepak S. Turaga, Elmsford, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 12/984,180

(22) Filed: Jan. 4, 2011

(65) Prior Publication Data
US 2012/0173136 A1 Jul. 5, 2012

(51) Int. Cl.
*G01C 21/00* (2006.01)
(52) U.S. Cl.
USPC .......................................... 701/411; 701/400
(58) Field of Classification Search
USPC .................. 701/400, 408, 414, 423
See application file for complete search history.

(56) References Cited

U.S. PATENT DOCUMENTS

| | | | |
|---|---|---|---|
| 5,889,477 A | 3/1999 | Fastenrath | |
| 6,317,686 B1 | 11/2001 | Ran | |
| 6,470,262 B2 | 10/2002 | Kerner et al. | |
| 6,496,773 B1 | 12/2002 | Olsson | |
| 6,587,779 B1 | 7/2003 | Kerner et al. | |
| 6,721,650 B2 | 4/2004 | Fushiki et al. | |
| 6,876,988 B2 | 4/2005 | Helsper et al. | |
| 7,082,364 B2 * | 7/2006 | Adamczyk | 701/485 |
| 7,274,306 B2 | 9/2007 | Publicover | |
| 7,363,144 B2 | 4/2008 | Liu et al. | |
| 7,427,930 B2 | 9/2008 | Arnold et al. | |
| 7,433,889 B1 | 10/2008 | Barton | |
| 7,472,099 B2 | 12/2008 | Nishiuma et al. | |
| 7,555,381 B2 | 6/2009 | Kumagai et al. | |
| 7,610,151 B2 | 10/2009 | Letchner et al. | |
| 7,668,946 B1 | 2/2010 | Garcia-Franco et al. | |
| 7,680,596 B2 | 3/2010 | Uyeki et al. | |
| 7,706,965 B2 | 4/2010 | Downs et al. | |
| 8,103,434 B2 | 1/2012 | Helbing et al. | |

(Continued)

FOREIGN PATENT DOCUMENTS

EP 1 127 727 A2 8/2001
WO WO 2008/063225 A2 5/2008

OTHER PUBLICATIONS

Williams, C. A., "A Data Mining Approach to Rapidly Learning Traveler Activity Patterns for Mobile Applications", University of Illinois at Chicago, 2010.

(Continued)

*Primary Examiner* — Hussein A. Elchanti
(74) *Attorney, Agent, or Firm* — Scully, Scott, Murphy & Presser, P.C.; Daniel P. Morris, Esq.

(57) ABSTRACT

A system, method and computer program product for obtaining a traffic route for a vehicle. The system receives information of a current location of the vehicle. The system determines a destination location or destination region of the vehicle. The system computes a plurality of available traffic routes from the current location to the destination location or to the destination region. The system estimates a potential demand for at least one potential passenger from the current location to the destination location or to the destination region per each available traffic route. The system recommends, to a driver of the vehicle, an available traffic route that has a highest estimated potential demand among a plurality of the available traffic routes.

21 Claims, 4 Drawing Sheets

300

| Location | Number of demands |
|---|---|
| A | 100 |
| B | 30 |
| ⋮ | ⋮ |
| C | 40 |

(56) References Cited

U.S. PATENT DOCUMENTS

| | | |
|---|---|---|
| 2001/0029425 A1 | 10/2001 | Myr |
| 2002/0049687 A1 | 4/2002 | Helsper et al. |
| 2003/0216858 A1* | 11/2003 | Sakai .......................... 701/201 |
| 2004/0038671 A1 | 2/2004 | Trayford et al. |
| 2004/0073361 A1 | 4/2004 | Tzamaloukas et al. |
| 2004/0143385 A1 | 7/2004 | Smyth et al. |
| 2005/0033511 A1* | 2/2005 | Pechatnikov et al. ......... 701/210 |
| 2005/0091176 A1 | 4/2005 | Nishiuma et al. |
| 2005/0125195 A1 | 6/2005 | Brendel |
| 2006/0058940 A1 | 3/2006 | Kumagai et al. |
| 2006/0122846 A1 | 6/2006 | Burr et al. |
| 2006/0206256 A1 | 9/2006 | Kumagai et al. |
| 2007/0208492 A1 | 9/2007 | Downs et al. |
| 2007/0208496 A1 | 9/2007 | Downs et al. |
| 2007/0208498 A1 | 9/2007 | Barker et al. |
| 2008/0030371 A1 | 2/2008 | Kumagai et al. |
| 2008/0046165 A1 | 2/2008 | Downs et al. |
| 2008/0175161 A1 | 7/2008 | Amemiya et al. |
| 2008/0235398 A1 | 9/2008 | Helbing et al. |
| 2009/0099760 A1 | 4/2009 | Lederman et al. |
| 2010/0042549 A1* | 2/2010 | Adamczyk et al. ............. 705/80 |

OTHER PUBLICATIONS

Gung, R. R., et al., "Demand Forecasting TODAY", OR/MS Today, Dec. 2002.

Williams, C. A., et al., "Mining Sequential Association Rules for Traveler Context Prediction", Proceeding Mobiquitous '08 Proceedings of the 5th Annual International Conference on Mobile and Ubiquitous Systems: Computing, Networking, and Services, 2008.

Liao, L., et al., "Learning and Inferring Transportation Routines", Journal Artificial Intelligence, Apr. 2007, vol. 171 Issue 5-6.

\* cited by examiner

300

| Location | Number of demands |
|---|---|
| A | 100 |
| B | 30 |
| ⋮ | ⋮ |
| C | 40 |

| Time of day | Number of demands |
|---|---|
| 12PM | 100 |
| 1PM | 120 |
| ⋮ | ⋮ |
| 11AM | 90 |

FIG. 3B ns,289 B2

ADVANCED ROUTING OF VEHICLE FLEETS

BACKGROUND

The present application generally relates to routing of fleets of vehicles. More particularly, the present application relates to finding traffic routes by which owners of the fleets can maximize their profits from the fleets.

Currently, when fleets of commercial vehicles in an urban area (e.g., New York City), e.g., taxies, are unoccupied by any passenger, drivers of the fleets of vehicles arbitrarily take any one of available traffic routes known to those drivers, to find potential passengers. While vehicle drivers of unoccupied vehicles (e.g., taxies with no passengers) are desirous of finding a best traffic route that can maximize their potential profits, e.g., by taking new passengers or additional passengers, there is no means available to inform the drivers of such routes where they can find potential passengers. Operating the unoccupied vehicles may reduce the profit of the owner(s) of the vehicles.

When the fleets of commercial vehicles are occupied by at least one passenger, drivers of the fleets of vehicles often arbitrarily take any one of available traffic routes known to those drivers. Due to a lack of information (e.g., real-time traffic information), the occupied vehicles (e.g., taxies with passengers) sometimes enter into a heavy traffic road even though there is an alternative traffic route that has less traffic. Sometimes, passengers get off the vehicles before the vehicle arrive at their destination locations, when the vehicles enter into heavy traffic roads. Then, the vehicles become unoccupied in a middle of the heavy traffic roads and spend their resources (e.g., fuels) without running meters. If the fleets of the vehicles enter into heavy traffic roads, profits of the owners of the fleets of the vehicles may be reduced, e.g., especially when the vehicles are operated based on flat rates (e.g., charging fees based on driving distances without a consideration of driving times) or when time is charged at a minimum per-minute rate. Passengers are also unhappy when their vehicle drivers take heavy traffic roads.

Although current path calculators (e.g., Google® Maps, Mapquest, etc.) provide traffic routing information between an origination location and a destination location, those current path calculators cannot predict travel time based on real-time traffic information. Furthermore, those path calculators fail to provide any indication of desirable routes having a potential demand (i.e., potential number of passengers) in or along a traffic route.

SUMMARY OF THE INVENTION

There is provided a system, method and computer program product for obtaining a traffic route for a vehicle (e.g., taxi) to maximize a profit in operating the vehicle. For example, by driving along the obtained traffic route, a driver of the vehicle can pick-up potential passengers.

In one embodiment, there is provided a system, method and computer program product for obtaining a traffic route for a vehicle. The system includes, but is not limited to: a memory device and a processor being connected to the memory device. The system receives information of a current location of the vehicle. The system determines a destination location or destination region of the vehicle. The system computes a plurality of available traffic routes from the current location to the destination location or to the destination region. The system estimates a potential demand for at least one potential passenger from the current location to the destination location or to the destination region per each available traffic route. The system recommends, to a driver of the vehicle, an available traffic route that has a highest estimated potential demand among a plurality of the available traffic routes.

In a further embodiment, to estimate the potential demand, the system retrieves historical passenger demand data from a database. The system uses the retrieved historical passenger demand data to estimate a probable destination location or destination region and to estimate the potential demand to the probable destination location or region.

In a further embodiment, to determine the destination location or the destination region, the system obtains information of the destination location or the destination region from a passenger of the vehicle. Alternatively, the system infers the destination location or the destination region based on the current location of the vehicle, a current driving direction of the vehicle, prior destination locations of the vehicle, prior destination regions of the vehicle, a current time of day, and a current day of week.

In a further embodiment, a GPS device associated with the vehicle provides the information of the current location of vehicle to the system.

In a further embodiment, a TPT (Traffic Prediction Tool) predicts the travel time from the current location to the destination location or to the destination region per each available traffic route.

BRIEF DESCRIPTION OF THE DRAWINGS

The accompanying drawings are included to provide a further understanding of the present invention, and are incorporated in and constitute a part of this specification.

FIGS. 3A-3B illustrate exemplary tables stored in database in one embodiment.

DETAILED DESCRIPTION

Figure 1:
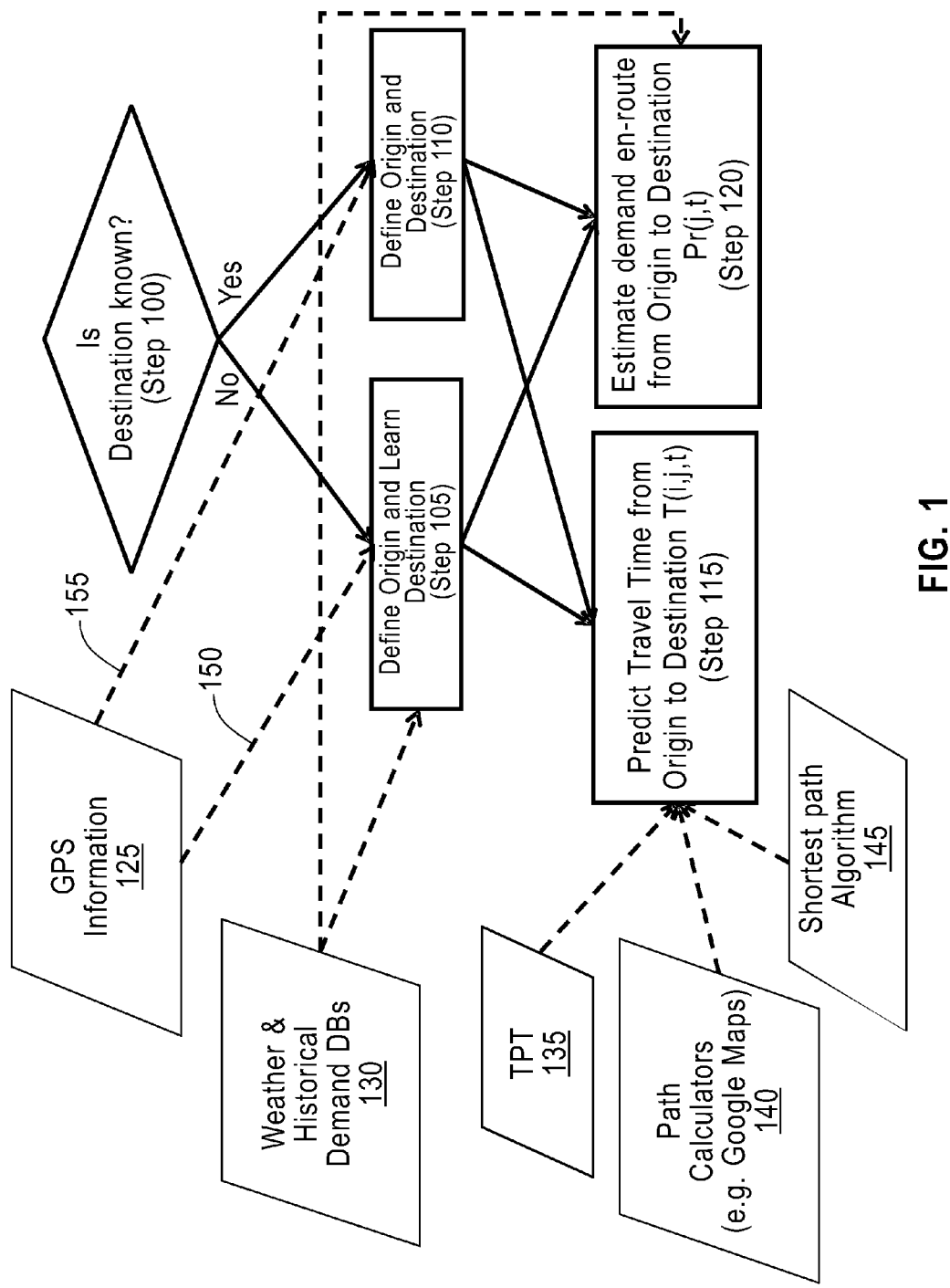
FIG. 1 is a diagram that illustrates method steps and system components for obtaining a traffic route for a vehicle in one embodiment.

FIG. 1 is a diagram that illustrates method steps and system components for obtaining a traffic route for a vehicle in one embodiment. A vehicle includes, but is not limited to: a taxi, a bus, a limousine, a truck, any other commercial vehicle, etc. A vehicle may include a computing system (e.g., a computing system 200 shown in FIG. 2). A computing system includes, but is not limited to: a tablet computer, a laptop, a netbook, a smart phone, an Apple® MacBook™, etc.

At step 100, the computing system is configured to evaluate whether a destination location (i.e., a specific place) of the vehicle is known or, if not, whether a destination region (e.g., a particular neighborhood or part of a city) can be inferred. For example, if a taxi has a passenger, the passenger tells his/her destination location to a driver of the taxi, and the driver enters information of the destination location to the computing system, e.g., via an input/output interface, then the computing system determines that the destination location is known. If a driver of the vehicle does not enter information of the destination location to the computing system but the vehicle is moving, the computing system determines that the destination location is unknown and may be inferred by the computing system. In one embodiment, the driver of the vehicle enters the information of the destination location to the computing system, e.g., via an input/output interface, a keyboard, a mouse, touch screen, etc. The computing system detects the movement of the vehicle, e.g., through a GPS device 125 attached to the vehicle, etc. The computing system also receives information (e.g., latitude and longitude) of a current location of the vehicle, e.g., from the GPS device 125 attached to the vehicle. For example, if the vehicle is not moving, the information of the current location of the vehicle from the GPS device 125 does not change for a pre-determined time period, e.g., at least for 10 minute. Otherwise, the GPS device 125 may provide, to the computing system, updated information of the current location of the vehicle periodically, e.g., every 1 minute.

Upon determining that the destination location of the vehicle is unknown, at step 105, the computing system is configured to learn the destination location or the destination region. In one embodiment, the computing system is configured to infer the destination location or the destination region based on the current location of the vehicle, a current driving direction of the vehicle, prior destination regions of the vehicle, prior destination locations of the vehicle, a current time of day, and/or a current day of week. In a further embodiment, the computing system receives the information of the current location of vehicle, the current driving direction of the vehicle, the prior destination region of the vehicle, and the prior destination location of the vehicle, e.g., from the GPS device 125 attached to the vehicle. The GPS device 125 may transmit these information, for example, in binary numbers (not shown) that represent a data structure (not shown; e.g., an array, a linked list, etc.) storing these information, e.g., via a wired or wireless communication link 150 between the computing system and the GPS device 125. The computing system deduces a possible destination location or destination region of the vehicle, e.g., by correlating the information of the current location of the vehicle with known map artifacts (e.g. known residential areas, travel hubs, business locations or city centers, bridges or tunnels or toll booths etc.), combining with historical records of prior destination locations and/or prior destination regions at different periods of time, and/or drawing inferences from current driving conditions of the vehicle (e.g. exit from a highway, reduced speed, frequent turns, etc.). Based on the information of the current location of the vehicle and of the current driving conditions of the vehicle, the computing system may be configured to identify similar prior trips, e.g., by searching a vehicle's own historical records or other vehicles' historical records stored in a database 130. Based on the similar prior trips, the computing system produces a list (not shown) of possible destination locations or destination regions, for example, for each day of the week and a time of day. In one embodiment, the database 130 stores this list of possible destination locations or destination regions for each day of the week and a time of day, etc. The database 130 may also store a list of possible destination locations or destination regions according to weather characteristics (e.g., rain, snow, very cold or hot temperatures, etc.).

An exemplary list of possible destination location for a particular taxi, on Friday afternoon from 5:00 PM to 7:00 PM, may show that typical destination locations from a lower Manhattan location include Penn Station, Grand Central Station, the Upper East Side from $60^{th}$ to $92^{nd}$ Street and Upper West Sides from $70^{th}$ street to $90^{th}$ Street. The computing system may remove and/or add some possible destination locations based on a current driving direction of the vehicle. In one embodiment, the computing system computes for each element (i.e., each possible destination location) on the list an associated confidence score, for example, computed from the historical records. For example, if a current day is $10^{th}$ day of a month, a current time is 12 PM, a current weather is sunny and a current location is Battery Park in Manhattan, N.Y., then the list of possible destination locations may include, e.g., Penn Station whose confidence score is 40% and Grand Central whose confidence score is 45%. The computing system may compute these confidence scores, e.g., by calculating each probability of each destination location among the samples that have characteristics of that a day is $10^{th}$ day of a month, a time is 12 PM, weather is sunny and a location is Battery Park in Manhattan, N.Y. Thus, when the pattern (i.e., $10^{th}$ day of a month, 12 PM, sunny weather, and Battery Park) is found in historical data set stored in database 130, for example, there is a computed 40% chance that the destination location is Penn Station, and there is a computed 45% chance that the destination location is Grand Central Station. The computing system may select a destination location whose confidence score is the highest as the destination location of the vehicle.

Returning to FIG. 1, at step 110, upon knowing the destination location or destination region of the vehicle, e.g., through an input from the driver of the vehicle and knowing the current location of the vehicle, e.g., through the GPS device 125 via a wired or wireless connection 155 between the GPS device 125 and the computing system, the computing system defines the destination location or destination region of the vehicle according to the input from driver and define the current location of the vehicle according to information (e.g., latitude and longitude) from the GPS device 125.

At step 115, based on the selected or defined destination location or destination region of the vehicle and the current location of the vehicle, the computing system computes a plurality of available traffic routes from the current location to the selected or defined destination location or destination region, e.g., by running one or more of path calculators 140 and/or running a shortest path algorithm 145 with the current location of the vehicle and the selected or defined destination location or destination region. The path calculators 140 include, but are not limited to: Google™ Maps, MapQuest™, Yahoo!® Maps, other traffic route finding application, etc.

Figure 4:
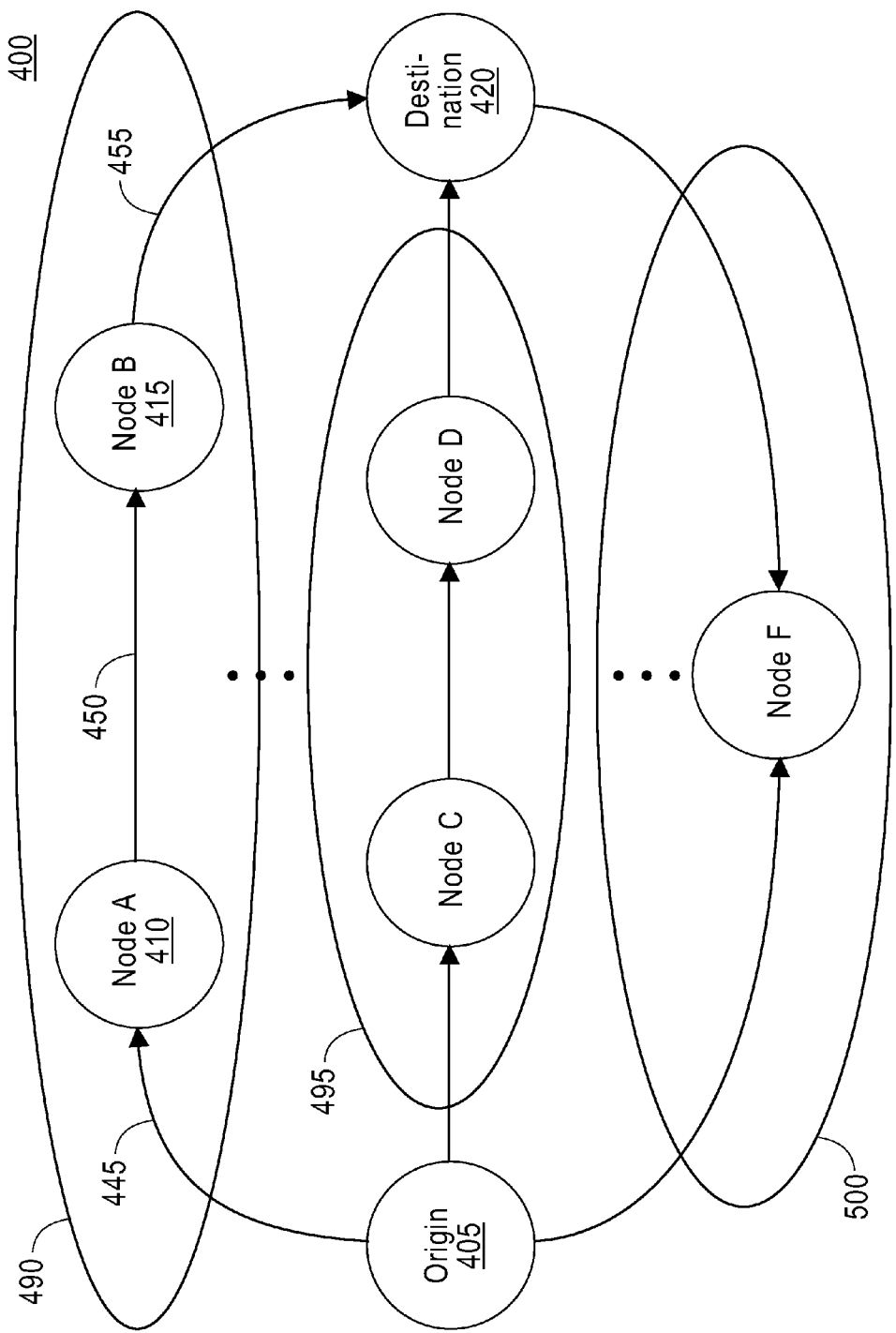
FIG. 4 illustrates exemplary traffic routes for a vehicle in one embodiment.

In running the shortest path algorithm 145, the computing system constructs a data structure, e.g., a graph, a linked list, a vector, etc., based on at least one electronic map (e.g., Google™ Maps, MapQuest™, Yahoo!® Maps, Navteq® map, etc.). Note that an electronic map can be considered as a graph. FIG. 4 illustrates an exemplary graph 400. A node (e.g., a node "A" 410) in the graph represents an intersection or a certain point in a traffic road where a traffic signal is installed. Each edge (e.g., an edge 460) in the graph represents a traffic link between two traffic nodes (e.g., two traffic intersections). Each edge may include at least one weight (not shown) that represents a length of the traffic link or a predicted travel time to travel or cross the traffic link. The electronic map may provide the length of each traffic link. A Traffic Prediction Tool (TPT) 135 may provide the predicted travel time per each traffic link. A traffic route includes at least one traffic link. For example, a first traffic route 490 that connects the current location 405 of the vehicle and the selected or defined destination location or destination region 420 of the vehicle includes three traffic links: a first traffic link 445, a second traffic link 450 and a third traffic link 455. The shortest path algorithm 145 finds a traffic route between two nodes, e.g., a node representing the current location of the vehicle and another node representing the destination location or destination region of the vehicle, that minimizes total cost (e.g., minimizes total predicted travel times) to travel between the two nodes.

In one embodiment, a Traffic Prediction Tool (TPT) 135 predicts vehicle travel times along a traffic link between two traffic nodes in real-time. Commonly owned, co-pending US Patent Application Publication No. 2008/0175161 A1 filed on Jan. 24, 2007, wholly incorporated by reference as if set forth herein, describes, among other things, a TPT in detail. Commonly owned, co-pending US Patent Application Publication No. 2010/0063715 A1 filed on Nov. 16, 2009, wholly incorporated by reference as if set forth herein, describes, among other things, a TPT in detail. The TPT 135 receives real-time traffic information between the two nodes, for example, from a real-time traffic information provider (e.g., Automotive Solutions of INRIX®, Inc., Radar-based Field Vehicle Counter TC-RS50-D from SenSource, Inc., etc.). The real-time traffic information may include, but is not limited to: a volume of the traffic, an average speed of the traffic, an occurrence of a car accident, street/road repairs, street/road constructions, etc. The real-time traffic information provider may provide this real-time traffic information to the TPT 135, for example, as binary representations (bits or bytes) of a character string (not shown) or a numerical string (not shown).

By utilizing information (e.g., predicted vehicle travel time per traffic link) from the TPT 135, at step 115, the computing system predicts a travel time per each available traffic route between the current location of the vehicle and the selected or defined destination location or destination region of the vehicle. For example, as shown in FIG. 4, if there are three available traffic routes (i.e., the first traffic route 490, a second traffic route 495, a third traffic route 500) between the current location of the vehicle 415 and the destination location or destination region of the vehicle 420, the TPT predicts travel times of each traffic link (e.g., the first traffic link 445, the second traffic link 450, the third traffic link 455, etc.). The TPT 135 may predict by using a statistical modeling technique, for example, a travel time of the first traffic link 445, e.g., as 7 minutes. The TPT 135 may predict, for example, a travel time of the second traffic link 450, e.g., as 10 minutes. The TPT 135 may predict, for example, a travel time of the third traffic link 455, e.g., as 10 minutes. Then, by adding all these predicted travel times of all the traffic links in the first route 490, the computing system determines that a predicted travel time of the first traffic route 490 is, for example, 27 minutes. Similarly, the computing system may calculate a predicted travel time of the second traffic route 495 and a predicted travel time of the third traffic route 500. In one embodiment, the computing system recommends the driver, e.g., via a display device (e.g., a display device 238 in FIG. 2), to take a traffic route whose predicted travel time from the current location to the destination location or to the destination region is the shortest, especially when the vehicle has at least one passenger.

In another embodiment, returning to FIG. 1, at step 120, the computing system estimates a demand (i.e., the number of potential customers) from the current location of the vehicle to the selected or defined destination location or destination region of the vehicle per each available traffic route. To estimate the demand per each available traffic route, the computing system retrieves historical passenger demand data from a database 130, and uses the retrieved historical passenger demand data to estimate a probable destination location or destination region and to estimate the potential demand to the probable destination location or destination region. For example, a company that controls a plurality of taxis may record and update this historical passenger demand data in the database 130 whenever a passenger gets in a taxi controlled by the company and whenever a passenger gets off a taxi controlled by the company. The historical passenger demand data include, but are not limited to: historical record of demand arranged per each vehicle, per each location, per each traffic link, by time of a day, by a day of a week, by a week of a month, by a month of a year, according to a weather condition, according to holidays, and according to events. In a further embodiment, the database 130 stores this historical passenger demand data in one or more tables. FIGS. 3A-3B illustrate exemplary tables 300-305 that describe historical passenger demand data. Table 300 in FIG. 3A describes average number of customers per each location. Table 305 in FIG. 3B describes average number of customers per each time of a day. The database 130 may also store the historical passenger demand data in a table (not shown) that includes a plurality of columns that represent the average number of demands, at each location, at each time of a day, at each traffic link, for each day of a week, for each week of a month, for each month of a year, at each weather condition, for each holiday, on each event, etc.

Since the retrieved historical passenger demand data may include an average number of customers per each traffic link, the computing system can estimate a demand per each available traffic route from the current location of the vehicle to the selected or defined destination location or destination region of the vehicle. For example, in FIG. 4, the retrieved historical passenger demand data may describe that an average number of customers of the first traffic link 445 at a current time is, e.g., three, that an average number of customers of the second traffic link 450 at the current time is, e.g., three, and that an average number of customers of the third traffic link 455 at the current time is, e.g., four. By adding all these average number of customers in all these traffic links 445-455, the computing system informs, e.g., via the display device 238 in FIG. 2, that the driver of the vehicle can expect around ten customers by taking the first traffic route 490. Similarly, the computing system calculates the number of expected customers per each available traffic route between the current location of the vehicle and the selected or defined destination location or destination region of the vehicle. Then, the computing system recommends the driver of the vehicle, e.g., via the display device 238 in FIG. 2, to take a traffic route that has the highest estimated demand (i.e., the highest number of expected customers).

In one embodiment, each vehicle includes the computing system that runs the method steps 100-120 in FIG. 1. A recommended traffic route from a computing system in a vehicle is not known to other drivers of other vehicles. Alternatively, the vehicles share their routing information each other. The computing system in each vehicle may run the method steps 100-120 in FIG. 1 in real-time. In another embodiment, a company that controls a fleet of vehicles (e.g., taxis, etc.) has one central computer (e.g., workstation, server device, etc.) that runs the method steps in FIG. 1. The central computing system is configured to, e.g., by running the method steps in FIG. 1, to allocate each vehicle of the fleet to a particular location at a certain time or to request each driver of each vehicle to take a particular traffic route or traffic link at a certain time to maximize potential profits of the company incurred due to potential passengers on or along the particular traffic route or traffic link. If there exists a central computer in the company, each vehicle run by the company may not include the computing system to run the method steps shown in FIG. 1. In one embodiment, the computing system runs the method steps 100-120 in real-time.

Figure 2:
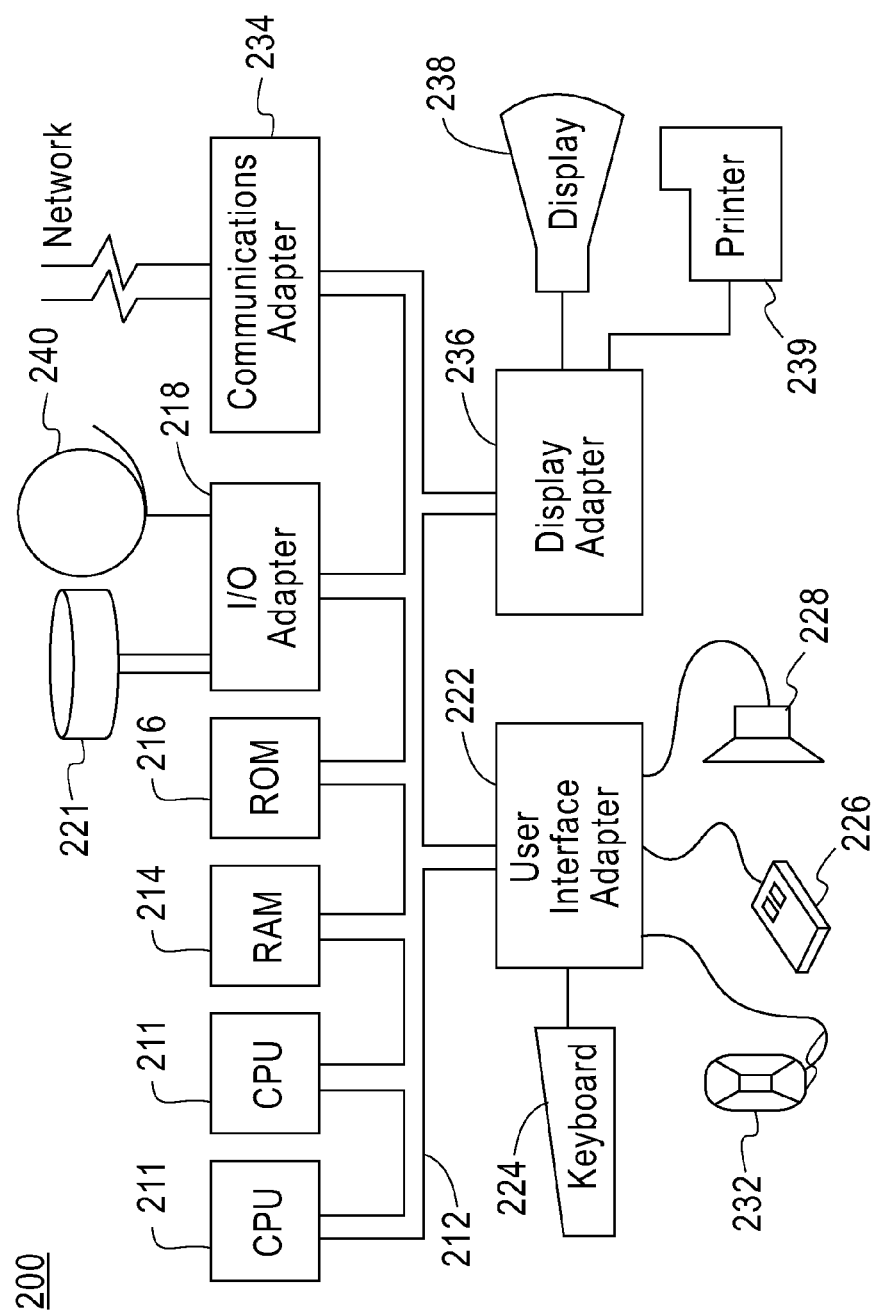
FIG. 2 illustrates an exemplary hardware configuration for running the method steps in FIG. 1 in one embodiment.

FIG. 2 illustrates an exemplary hardware configuration of the computing system 200 that runs method steps described in FIG. 1 in one embodiment. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for obtaining a traffic route for a vehicle, the method comprising:
receiving information of a current location of the vehicle;
determining a destination location or destination region of the vehicle;

computing a plurality of available traffic routes from the current location to the destination location or destination region;

estimating a potential demand for at least one potential passenger from the current location to the destination location or to destination region per each available traffic route; and recommending, to a driver of the vehicle, an available traffic route that has a highest estimated potential demand among a plurality of the available traffic routes;

wherein a computing system including at least one processor performs one or more of: the receiving, the determining, computing, and estimating.

2. The method according to claim 1, wherein the estimating the potential demand includes steps of:

retrieving historical passenger demand data from a database; and using the retrieved historical passenger demand data to estimate a probable destination location or destination region and to estimate the potential demand to the probable destination location or destination region.

3. The method according to claim 2, wherein the historical passenger demand data includes one or more of: historical record of demand arranged per each vehicle, per each location, per each traffic link, by time of a day, by a day of a week, by a week of a month, by a month of a year, according to a weather condition, according to holidays, and according to events.

4. The method according to claim 1, wherein the determining the destination location or destination region includes steps of:

obtaining information of the destination location or destination region from a passenger of the vehicle; or inferring the destination location or destination region based on the current location of the vehicle, a current driving direction of the vehicle, prior destination locations of the vehicle, prior destination regions of the vehicle, a current time of day, and a current day of week.

5. The method according to claim 1, wherein a GPS device associated with the vehicle provides the information of the current location of vehicle to the computing system.

6. The method according to claim 1, wherein the computing a plurality of available traffic routes includes a step of:

running at least one path calculator with the current location and the destination location or the destination region.

7. The method according to claim 1, wherein the computing a plurality of available traffic routes includes a step of:

running a shortest path algorithm with the current location and the destination location or the destination region.

8. The method according to claim 1, wherein a TPT (Traffic Prediction Tool) predicts the travel time from the current location to the destination location or to the destination region per each available traffic route.

9. The method according to claim 8, further comprising:

recommending, the driver of the vehicle, an available traffic route whose predicted travel time from the current location to the destination location or to the destination region is shortest.

10. A system for obtaining a traffic route for a vehicle, the system comprising:

a memory device; and a processor being connected to the memory device, wherein the processor is configured to:

receive information of a current location of the vehicle;

determine a destination location or destination region of the vehicle;

compute a plurality of available traffic routes from the current location to the destination location or to the destination region;

estimate a potential demand for at least one potential passenger from the current location to the destination location or to the destination region per each available traffic route; and recommend, to a driver of the vehicle, an available traffic route that has a highest estimated potential demand among a plurality of the available traffic routes.

11. The system according to claim 10, wherein to estimate the potential demand, the processor is configured to:

retrieve historical passenger demand data from a database; and use the retrieved historical passenger demand data to estimate a probable destination location or destination region and to estimate the potential demand to the probable destination location or destination region.

12. The system according to claim 11, wherein the historical passenger demand data includes one or more of: historical record of demand arranged per each vehicle, per each location, per each traffic link, by time of a day, by a day of a week, by a week of a month, by a month of a year, according to a weather condition, according to holidays, and according to events.

13. The system according to claim 10, wherein to determine the destination location or the destination region, the processor is configured to:

obtain information of the destination location or the destination region from a passenger of the vehicle; or infer the destination location or the destination region based on the current location of the vehicle, a current driving direction of the vehicle, prior destination locations of the vehicle, prior destination regions of the vehicle, a current time of day, and a current day of week.

14. The system according to claim 10, wherein a GPS device associated with the vehicle provides the information of the current location of vehicle to the computing system.

15. The system according to claim 10, wherein to compute a plurality of available traffic routes, the processor is configured to:

run at least one path calculator with the current location and the destination location or the destination region.

16. The system according to claim 10, wherein to compute a plurality of available traffic routes, the processor is configured to:

run a shortest path algorithm with the current location and the destination location or the destination region.

17. The system according to claim 10, wherein a TPT (Traffic Prediction Tool) predicts the travel time from the current location to the destination location or to the destination region per each available traffic route.

18. The system according to claim 17, wherein the processor is further configured to:

recommend, to the driver of the vehicle, an available traffic route whose predicted travel time from the current location to the destination location or to the destination region is shortest.

19. A computer program product for obtaining a traffic route for a vehicle, the computer program product comprising a storage medium, the storage medium excluding a propagating signal, the storage medium readable by a processing circuit and storing instructions run by the processing circuit for performing a method, the method comprising:

receiving information of a current location of the vehicle;

determining a destination location or destination region of the vehicle;

computing a plurality of available traffic routes from the current location to the destination location or to the destination region;

estimating a potential demand for at least one potential passenger from the current location to the destination location or to the destination region per each available traffic route; and recommending, to a driver of the vehicle, an available traffic route that has a highest estimated potential demand among a plurality of the available traffic routes.

20. The computer program product according to claim 19, wherein the estimating the demand includes steps of:

retrieving historical passenger demand data from a database; and using the retrieved historical passenger demand data to estimate a probable destination location or destination region and to estimate the potential demand to the probable destination location or destination region.

21. The computer program product according to claim 19, wherein the historical passenger demand data includes one or more of: historical record of demand arranged per each vehicle, per each location, per each traffic link, by time of a day, by a day of a week, by a week of a month, by a month of a year, according to a weather condition, according to holidays, and according to events.

* * * * *